United States Patent
McCoy

(10) Patent No.: US 11,669,572 B2
(45) Date of Patent: *Jun. 6, 2023

(54) ACCELERATED OPERATIONS ON COMPRESSED DATA STORES

(71) Applicant: Quantcast Corporation, San Francisco, CA (US)

(72) Inventor: Scott S. McCoy, Oakland, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,051

(22) Filed: Feb. 4, 2022

(65) Prior Publication Data
US 2022/0156328 A1    May 19, 2022

Related U.S. Application Data

(63) Continuation of application No. 16/557,956, filed on Aug. 30, 2019, now Pat. No. 11,244,008.

(51) Int. Cl.
*G06F 16/903* (2019.01)
*G06F 16/955* (2019.01)
*G06F 16/953* (2019.01)

(52) U.S. Cl.
CPC .. *G06F 16/90344* (2019.01); *G06F 16/90348* (2019.01); *G06F 16/953* (2019.01); *G06F 16/955* (2019.01)

(58) Field of Classification Search
CPC ............. G06F 16/90344; G06F 16/955; G06F 16/953; G06F 16/90348
See application file for complete search history.

(56) References Cited

U.S. PATENT DOCUMENTS

| 7,729,496 B2* | 6/2010 | Hacigumus | ........... H04L 9/0894 |
| | | | 713/193 |
| 7,747,799 B2* | 6/2010 | Nakagawa | .............. G06F 3/064 |
| | | | 710/33 |
| 2015/0143112 A1* | 5/2015 | Yavuz | ................ G06F 21/6227 |
| | | | 713/165 |
| 2018/0121364 A1* | 5/2018 | Edgar | ................. G06F 12/1009 |

OTHER PUBLICATIONS

Lemire, D. et al., "Decoding billions of integers per second through vectorization," arXiv: 1209.2137v4, Feb. 19, 2013, pp. 1-30.
Lemire, D. et al., "SIMD Compression and the Intersection of Sorted Integers," arXiv: 1401.6399v12, May 7, 2015, pp. 1-29.

* cited by examiner

*Primary Examiner* — Baoquoc N To
(74) *Attorney, Agent, or Firm* — Andrea Wheeler

(57) ABSTRACT

A data operations system receives compressed data and a search term. The data operations system completes a modified decoding of the compressed data, resulting in distinguishable data terms that are smaller than the corresponding data terms, and loads modified decoded terms into a data register. The data operations system generates a truncated search term and loads instances of the truncated search term into a query register. The data operations system performs a parallel data operation, such as a query operation, by comparing each of the modified decoded terms to an instance of the truncated search term. The data operations system returns the results of the operation.

21 Claims, 5 Drawing Sheets

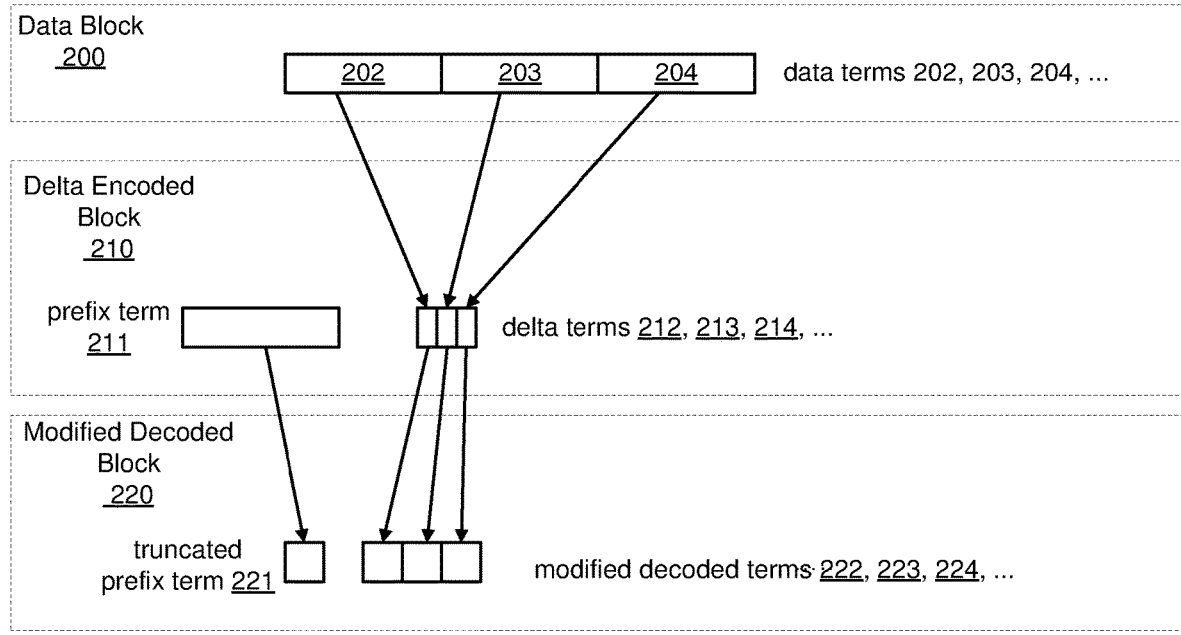

Block 200 data terms (decimal): 68,926 to 101,158
Block 200 data terms (binary): 10000110100111110 (17 bits) to 11000101100100110 (18 bits)
Block 200 range size (decimal): 32,233
Block 200 range size (binary): 111110111101001 (15 bits)

Delta Encoded Block 210 prefix term (decimal): 68,926
Delta Encoded Block 210 prefix term (binary): 10000110100111110 (17 bits)
Delta Encoded Block 210 largest delta (decimal): 250
Delta Encoded Block 210 largest delta (binary): 11111010 (8 bits)

Bit-width of Data Register: 64 bits
Bit-width of Query Register: 64 bits
Bit-width of available query operations: 8 bits, 16 bits, 32 bits, 64 bits
Target word Size: 16 bits Modified Decoded Block 220 truncated prefix term 221 (binary): 0000110100111110 (16 bits)
Modified Decoded Block 220 modified decoded terms 222, 223, 224 (binary): (16 bits)

Search term 131 (decimal): 81,104
Search term 131 (binary): 10011110011010000 (17 bits)
Truncated search term 231: 0011110011010000 (16 bits)

ACCELERATED OPERATIONS ON COMPRESSED DATA STORES

CROSS-REFERENCE TO RELATED APPLICATIONS

This application is a continuation of U.S. Non-Provisional application Ser. No. 16/557,956 entitled "Accelerated Operations on Compressed Data Stores" by Scott S. McCoy, filed on Aug. 30, 2019, which is hereby incorporated by reference in its entirety.

FIELD OF THE INVENTION

This invention pertains in general to the field of executing queries on compressed data.

DESCRIPTION OF RELATED ART

Storage of uncompressed data can require significant storage capacity, especially for large numbers. Compression techniques can compress data to minimize storage requirements. For example, a family of techniques called delta encoding may be used to compress data. Delta encoding is particularly efficient for sequentially ordered data where each data item is a large value but the difference (or "delta") between data items is relatively small. Using delta encoding techniques, the first number of a sequence of n numbers can be stored. Instead of storing the second number, only the delta corresponding to the difference between the second number and the first number is stored. For the nth number, only the delta corresponding to the difference between the nth number and the (n-1)th number is stored. For a large sequence of large numbers with comparatively small deltas, using compression such as delta encoding can result in significant data compression and reduction in required storage capacity. However, in order to perform operations on the data, such as a query operation, at least some of the compressed data generally must be decoded, or uncompressed. Uncompressing a large volume of data can be very time consuming. It can also consume a large amount of processor resources and require a large amount storage for the uncompressed data.

What is needed is a method that can more quickly perform operations on compressed data sets while using minimal processor and data storage resources.

SUMMARY

In an embodiment, a query system receives a set of compressed data. In an example, the data comprises an ordered list of unique data terms (or values). In an example, the data may correspond to identifiers of entities who have accessed internet domains. In a particular example, the received data may be a compressed inverted index of identifiers and accessed internet domains. In another particular example, the received data may be a compressed inverted index of internet domains and keywords in the internet domains. The data may be compressed using delta encoding. With delta encoding techniques, the first number of the sequence of n numbers can be stored. Instead of storing the second number, only a delta corresponding to the difference between the second number and the first number is stored. For the nth number, only the delta corresponding to the difference between the nth number and the (n-1)th number is stored. For a large sequence of large numbers with comparatively small deltas, using compression techniques such as delta encoding can result in significant data compression and reduction in required storage capacity. The data may be compressed using other encoding techniques.

The received compressed data is structured in blocks. Each compressed block contains a number of terms, for example 128 terms. In an example, a block corresponds to a posting (or entry or line) in an inverted index. In an example, the compressed data block may comprise terms representing document (or site or domain) identifiers where a specific term appears. In another embodiment, the compressed data block may comprise terms representing identifiers of visitors to a specific site or internet domain. In an embodiment using delta encoding, each term comprises a delta. The query system also receives prefix terms, each block having a corresponding prefix term. The prefix term contains a term that is no larger than the smallest uncompressed data term in the corresponding compressed block. In an example, the prefix term is the largest uncompressed data term in the previous uncompressed block. The first term in the compressed block is the difference between the corresponding prefix term and the first uncompressed data term. Each compressed data block has a largest delta corresponding to the largest delta term in the compressed data block. Each compressed data block has a range corresponding to the difference between the largest uncompressed data term and the smallest uncompressed data term in the compressed block.

In an example:
uncompressed data blockdata terms (decimal): 132, 133, 137, 139
data terms (binary): 10000100, 10001100, 10011011, 10110010
inclusive range (decimal): 8
inclusive range (binary): 1000 (4 bits)
compressed (delta encoded) data block prefix term: 131
prefix term (binary): 10000011
delta terms (decimal): 1, 1, 4, 2
delta terms (binary): 1, 1, 100, 10: 1, 1, 100, 10
largest delta: 3 bits The query system analyzes the range to determine the smallest number of bits required to represent the range in binary (4 bits in the example above). The query system then determines the "bit-width" (number of bits) of a data register and the bit-widths of available query options. The query system determines the smallest bit-width (or "target word size") available as a query option which is at least as large as the range. Continuing the example above:
bit-width of data register: 16 bits
bit-width of query register: 16 bits
available query operations: 2 bits, 4 bits, 8 bits, 16 bits
selected query option: 4 bits (smallest query operation at least as big as the range)
target word size: 4 bits The query system creates a truncated prefix term by retaining the number of least significant bits (or ("LSBs") corresponding to the target word size, and dropping the remaining most significant bits (or "MSBs"). Continuing the example above:
target word size: 4 bits
truncated prefix term: 0011 (LSBs corresponding to target word size)

The query system generates a modified decoded block using the truncated prefix term and the delta terms to generate modified decoded terms, wherein the first modified decoded term is generated by adding the delta term to the truncated prefix term, and each subsequent modified decoded term is generated by adding the corresponding delta term to the previous modified decoded term. Continuing the example above:

modified decoded data block truncated prefix term: 0011
    modified decoded terms: 0100 (0011+0001)
    0101 (0100+0001)
    1001 (0101+0100)
    1011 (1001+0010)

In the example above, the modified decoded terms are all distinguishable and smaller than the fully decoded (or "fully uncompressed") data terms (e.g., 8 bits). The modified decoded terms may be the same size or smaller than the fully compressed terms. The modified decoded terms are also the same number of bits as the truncated prefix term. The truncated prefix term (i.e., 4 bits) is smaller than the prefix term (i.e., 8 bits). The data storage required for the truncated prefix term plus the modified decoded terms is more than required for the fully compressed data but less than required for the fully decoded (uncompressed) data.

The query system generates a truncated search term by retaining the number of least significant bits (or "(LSB") corresponding to the target word size, and dropping the remaining most significant bits (or "MSBs"). Continuing the simple example above:

search term (decimal): 135
    search term (binary): 10000111
    truncated search term: 0111

The query system determines a number of virtual data sub-registers corresponding to the data register by dividing the bit-width of the data register by the target word size. The query determines a number of virtual query sub-registers corresponding to the query register by dividing the bit-width of the query register by the target word size. Preferably, the query system has at least as many bits as the data register. Continuing the example above:

bit-width of data register: 16 bits
    bit-width of query register: 16 bits
    target word size: 4 bits
    number of modified decoded data terms per data register: 4
    number of data sub-registers: 4
    number of query sub-registers: 4

The query system sequentially loads one modified decoded term into each data sub-register. The query system loads the truncated search term into each of the query sub-registers. Continuing the example above:

search register loaded with modified decoded terms:

| sub register 1 | sub register 2 | sub register 3 | sub register 4 |
| --- | --- | --- | --- |
| 0100 | 0101 | 1001 | 1011 | query register loaded with truncated search term:

| sub register 1 | sub register 2 | sub register 3 | sub register 4 |
| --- | --- | --- | --- |
| 0111 | 0111 | 0111 | 0111 |

The query system executes a parallel compare operation of the query register to the search register wherein each query sub-register is compared to its corresponding search sub-register. The query system determines if a match is found. If a match is not found, the query system loads the search register with the next set of sequential modified decoded data terms. In this example, a match is not found.

In other words, the uncompressed data block containing data terms 132, 133, 137, 139 does not contain the search term 135. The modified query operation can compare more data terms in the same amount of time using the modified decoded data terms than comparing the fully decoded data. In this example, the search register and query register could only be loaded with two fully decoded (8 bit) data terms and complete two compare operations in parallel, while four compare operations could be completed in parallel using the invention.

The invention as described above offers several advantages. The amount of storage space required to store the modified decoded data for an operation, such as a query operation, is reduced compared to the storage space required to store fully decoded data. The query system can perform more queries in one processing cycle by loading more modified decoded data terms into the data register and more truncated search terms into the query register, compared to loading fully decoded data terms and un-truncated search terms. Thus, the amount of time required to perform operations is reduced. Furthermore, the invention is adaptable (or customizable) to the density of the data: a data block which encompasses a larger range of values may have a larger truncated prefix resulting in larger modified decoded data terms (while still smaller than fully decoded data terms), while a data block which compasses a small range of values may have a smaller truncated prefix, resulting in smaller modified decoded terms. This is particularly advantageous when working with unpredictable data, such as website visitation data. Because the range size of a compressed encoded block can be unpredictable, preconfiguring a system with a static search and query sub-register size may require selecting the largest necessary size, reducing the efficiency of the query system. Alternatively, the invention is adaptable to the capability of the query system: a query system that is capable of sub-dividing the search and query registers into smaller sub-registers may enable storing more modified decoded terms in the search register and enable more query operations to be performed in parallel.

The invention may apply to other types of compression techniques, as described in more detail below.

The features and advantages described in the specification are not all inclusive and many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 2 is a diagram illustrating aspects of accelerated operations on compressed data stores, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention include a method, a system, and a non-transitory computer-readable storage medium storing computer-executable instructions for performing a modified decoding (or decompression) of previously encoded (or compressed) data to perform an adaptively selected operation, such as a query operation. Advantageously, this enables a query system to adaptively perform operations, which will reduce the data storage resources required, reduce the time expended to decompress data and complete query operations, and make more efficient use of the query system resources such as data storage and data/query registers.

Figure 1:
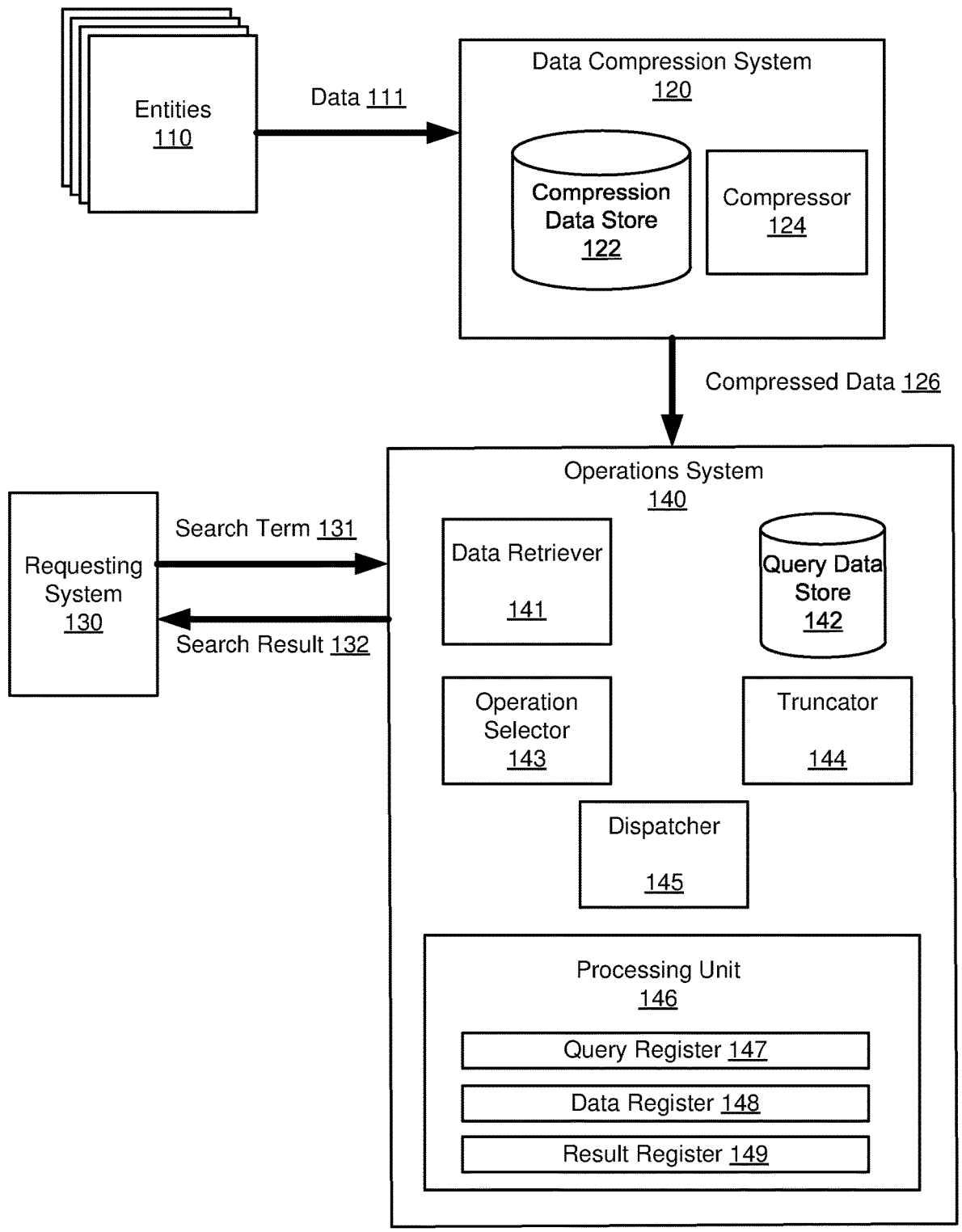
FIG. 1 is a high-level block diagram of a computing environment for performing accelerated operations on compressed data stores, in accordance with an embodiment of the invention.

FIG. 1 is a high-level block diagram of a computing environment for accelerated operations on compressed data stores, in accordance with an embodiment of the invention. The computing environment includes entities 110, data compression system 120, requesting system 130, and operations system 140. The computing environment may include additional, fewer, and/or different modules than the ones shown in FIG. 1. Moreover, the functionalities can be distributed among the modules in a different manner than described here. These elements are connected by one or more communication networks (not shown) such as a local area network, a wide area network, a wireless network, an intranet, a cable network, a satellite network, a cellular phone network, an optical network, the Internet, or combinations thereof.

Entity 110 accesses content over a network from a content provider, such as a web domain. Entity 110 may include software installations, hardware devices, or both. Software installations may include a web browser instance, mobile application, video viewer instance, or set-top box software residing on a hardware device. A hardware device can comprise a computer, personal digital assistant (PDA), cell phone, or set-top unit (STU) such as a STU used in conjunction with cable television service. A consumer (or "user" or "visitor") is a person or group of people who accesses a content provider or web domain (or visits an internet site, internet domain, or web domain) by operating entity 110. For example, a consumer may operate entity 110 installed on a laptop computer to access a web domain. In some cases, entity 110 may comprise a combination of entities which are logically grouped together to represent individuals, households, or groups of individuals who access domain 110. Although only one entity 110 is shown in FIG. 1 for clarity, any number of entities may be connected to the data compression system 120 by one or more communication networks (not shown).

Entity 110 comprises an identifier that can be used to identify entity 110. In an example, a hardware device identifier such as a Media Access Control Address (MAC address) can be stored with entity 110. In another example, a software identifier such as a cookie value may be stored with entity 110. In some embodiments, identifiers used to identify entity 110 can be partially or wholly composed and/or stored remotely from entity 110.

Entities 110 provide data 111 to data compression system 120. In an embodiment, data 111 comprises entity identifiers and consumption histories corresponding to entities 110. Consumption history may comprise browsing history of entity 110, demographic information about entity 110, information about domains accessed by entity 110, browser settings used by entity 110 to access domains, timezone and geographic information about an access of a domain by entity 110, or values associated with an access by entity 110 to a domain (e.g., a price of an item purchased by entity 110).

Data compression system 120 is a computing system that compresses data 111. Data compression system 120 comprises compression data store 122 and compressor 124. In an embodiment, data compression system 120 receives data 111 from entities 110. In other embodiments, data compression system 120 may receive other data from other sources. Data compression system 120 stores received data 111 in compression data store 122. Compressor 124 performs the data compression operations on data 111 to generate compressed data 126 (as described below with reference to FIG. 2), and stores compressed data 126 in compression data store 122. Data compression system 120 provides compressed data 126 to operations system 140.

FIG. 2 illustrates data compression operations performed by compressor 124. In an embodiment of the invention, data block 200 comprises a plurality of uncompressed data terms (or integers or values) 202, 203, 204, etc., which comprise data terms arranged in order of increasing or decreasing value. In an example, each data term corresponds to a unique identifier of an entity 110; the data terms may comprise digitized versions of cookie values, hashed cookie values, or some other mapping of a unique cookie value to a unique integer. In this example, requesting system 130 may provide search term 131 corresponding to a specific entity identifier to determine if a consumer corresponding to the specific identifier visited a particular site (or document or internet domain). In another example, each data term corresponds to site (or document or internet domain) identifiers where a particular term appears; in this example, search term 131 may be a specific site (or document or internet domain) identifier, to determine if the specific site (or document or internet domain) contains the particular keyword. In another example, each data term corresponds to a term or keyword found in a particular (or document or internet domain); in this example search term 131 may be a specific keyword, to determine if a particular site (or document or internet domain) contains the specific keyword. Not all terms in the range of the block will necessarily appear in the block. In an embodiment, a block of data terms has a range that describes the difference between the smallest data term that can possibly appear in that range and the largest integer that can possibly appear in that range. All integers in block 200 fall within the range of values 68,926 to 73,454. In this example, the range size is inclusive, or is one more than the smallest data term (68,926) subtracted from the largest data term (101,158), or 32,233. In other embodiments, a range is exclusive, or is equal to the smallest term subtracted from the largest term.

A type of compression known as delta encoding will be used for the purpose of illustration in the example illustrated in FIG. 2. Operating the invention using other types of compression and/or encoding is described in more detail below. In this example, compressor 124 compresses data terms 202, 203, 204, etc., using delta encoding to generate delta encoded block 210 comprising a plurality of delta terms 212, 213, 214, etc. Delta encoded block 210 has a corresponding prefix term 211. The smallest integer that could possibly appear in the range is the prefix term 211. In this example, the block's prefix term 211 is 68,926. The value of the smallest integer in the block cannot be less than 68,926; however, the value of the smallest integer in the block is not necessarily equal to prefix term 211. In an example, prefix term 211 is the largest uncompressed data term in the previous uncompressed data block. The first delta term 212 represents the difference between prefix term 211 and the first data term 202 in data block 200. Each subsequent delta term (213, 214, etc.) represents the difference between two adjacent data terms of block 200 (e.g. delta term 213 equals the difference between data term 203 and the data term 202). The storage size allotted to each delta term is determined according to the storage size required for the largest delta term. In this example, the largest delta term has a value of 250 (decimal), which can be stored in 8 bits; so each delta term 212, 213, 214, etc., in delta encoded block 210 is allocated 8 bits of storage. Delta encoded block 210 and prefix term 211 are stored in compression data store 122. In an embodiment, the range corresponding to delta encoded block 201 is also stored in compression data store 122.

Data compression module 120 may perform other functions on data 111 before or after compressing data 111. In an example where 111 comprises entity identifiers and consumption histories corresponding to entities 110, data compression system 120 may generate an index of entity identifiers and keywords from a corresponding entity's consumption history and then may generate an inverted index of the data, prior to compressing the data corresponding to the inverted index. In this example, data block 200 may correspond to an entry (or posting) in the inverted index.

Data compression system 120 is shown as external to operations system 140 in FIG. 1, but in other implementations, data compression system 120 may be internal to operations system 140. Data compression system 120 may include additional, fewer, and/or different modules than the ones shown in FIG. 1. Moreover, the functionalities can be distributed among the modules in a different manner than described here.

Referring back to FIG. 1, requesting system 130 is a computing system, which requests a query be performed on compressed data 126 by operations system 140. Requesting system 130 sends data corresponding to search term (or query term or operation term) 131 to operations system 140. For example, search term 131 may be a keyword, an entity identifier, or an identifier of a domain. Requesting system 130 receives data corresponding to search result 132 from operations system 140. In an example, search result 132 may be an indication that a match to search term 131 was found. In another example, search result 132 may be an identifier of entity 110, which has search term 131 in its consumption history. In another example, search result 132 may be an identifier of entity 110, which has accessed a domain corresponding to search term 131.

Operations system 140 is a computing system which receives compressed data 126 and search term 131, completes a modified decoding of compressed data 126, generates a truncated search term, completes a data operation such as query operation using the modified decoded data and the truncated search term, and returns the result of the operation, such as search result 132, to requesting system 130. In an embodiment, operations system 140 receives compressed data 126 from data compression system 120 and search term 131 from requesting system 130. In other embodiments, operations system 140 may receive other data and/or search terms from other sources. In the example illustrated in FIG. 2, compressed data 126 comprises data blocks such as delta encoded block 210 and prefix term 211. In the example illustrated in FIG. 2, operations system 140 acts as a query system. Operations system 140 comprises the following modules: data retriever 141, query data store 142, operation selector 143, truncator 144, dispatcher 145, and processing unit 146. Operations system 140 may include additional, fewer, and/or different modules than the ones shown in FIG. 1. Moreover, the functionalities can be distributed among the modules in a different manner than described here.

Data retriever 141 receives compressed data 126 from data compression system 120 and stores compressed data 126 in query data store 142. In an example, compressed data 126 comprises delta encoded block 210. In this embodiment, data retriever 141 determines prefix term 211 and the range size corresponding to delta encoded block 210, and stores them in query data store 142. In other embodiments, compressed data 126 comprises prefix term 211 and/or the corresponding range size.

In an embodiment, data retriever 141 only receives delta encoded block 210 that has a range that comprises search term 131. In another embodiment, data retriever 141 may determine that delta encoded block 210 has a range that comprises search term 131 based on the corresponding prefix term 211; in this embodiment, data retriever 141 only receives and stores delta encoded block 210 and corresponding prefix term 211 and range size. In another embodiment, data retriever 141 retrieves and stores multiple delta encoded blocks without determining that delta encoded block 210 has a range that comprises the search term; in this embodiment, data retriever 141 may determine that delta encoded block 210 stored in query data store 142 has a range that comprises the search term based on the corresponding prefix term 211.

Query data store 142 stores compressed data 126, prefix term 211, truncated prefix term 221, search term 131, truncated search term 231, and search result 132, as described above and below.

Operation selector 143 selects the query operation and the corresponding target word size corresponding to compressed data 126, query register 147, and data register 148. In the example illustrated in FIG. 2, compressed data 126 comprises delta encoded block 210 having a range that comprises search term 131, and corresponding prefix term 211. Operation selector 143 determines the number of bits required to represent the range of data terms 202, 203, 204, etc., in data block 210 in binary. In this example, the range is 32,233 in decimal, or 111110111101001 (15 bits) in binary. Operation selector 143 determines the bit-width of query register 147 and data register 148. In this embodiment, the bit-width of query register 147 and data register 148 are each 64 bits. Operation selector 143 determines the bit-width of the available query operations. In this example, the bit-widths of the available query operations are 8 bits, 16 bits, 32 bits, and 64 bits. Operation selector 143 determines the target word size corresponding to the smallest bit-width query operation that is at least many bits as the range of data block 200. In this embodiment, the range requires 15 bits; the smallest bit-width query operation that is at least as many bits as the range is 16 bits. Therefore, in this example, operation selector 143 selects a target word of 16 bits and a 16 bit query operation. If the bit-width of query register 147 and data register 148 are different, the available query operations will be limited by the bit-width of the smallest register.

Truncator 144 converts prefix term 211 to truncated prefix term 221, converts delta encoded block 210 into modified decoded block 220 comprising modified decoded delta terms 222, 223, 224, etc., and converts search term 131 to truncated search term 231. Truncator 144 generates truncated prefix term 211 by retaining the least significant bits (or LSBs) of prefix term 210 corresponding to the number of bits in the target word size, and dropping the remaining the most significant bits (MSBs), resulting in a truncated prefix term 221 comprising a number of bits equal to the selected target word. Referring to the example illustrated in FIG. 2, prefix term 211 is equal to a decimal value of 68,926 with a corresponding binary representation of 10000110100111110 that requires a storage space of 17 bits. The target word size is 16 bits. In this example, truncator 144 truncates the most significant bit of the binary representation of the prefix term to create a 16 bit truncated prefix term 221 of 0000110100111110. Modified decoded term 222 is generated by adding delta term 212 to truncated prefix 221; modified decoded term 223 is generated by adding delta term 213 to modified decoded term 222; and so on for the remaining modified decoded terms. In this way, the modified decoded terms are all distinguishable, while requiring less space (16 bits) than the corresponding fully decoded (uncompressed) terms (17-18 bits). Truncator 144 converts search term 131 to truncated search term 231 by retaining the least significant bits of search term 131 corresponding to the number of bits in the target word size, and dropping the remaining most significant bits of search term 131, resulting in truncated search term 231 comprising a number of bits equal to the selected target word. In this example, search term 131 is 81,104 in decimal, 10011110011010000 (17 bits) in binary. Truncator 144 truncates the most significant bit of the binary representation of search term 131 to create a 16 bit truncated search term 231 of 0011110011010000.

Figure 3:
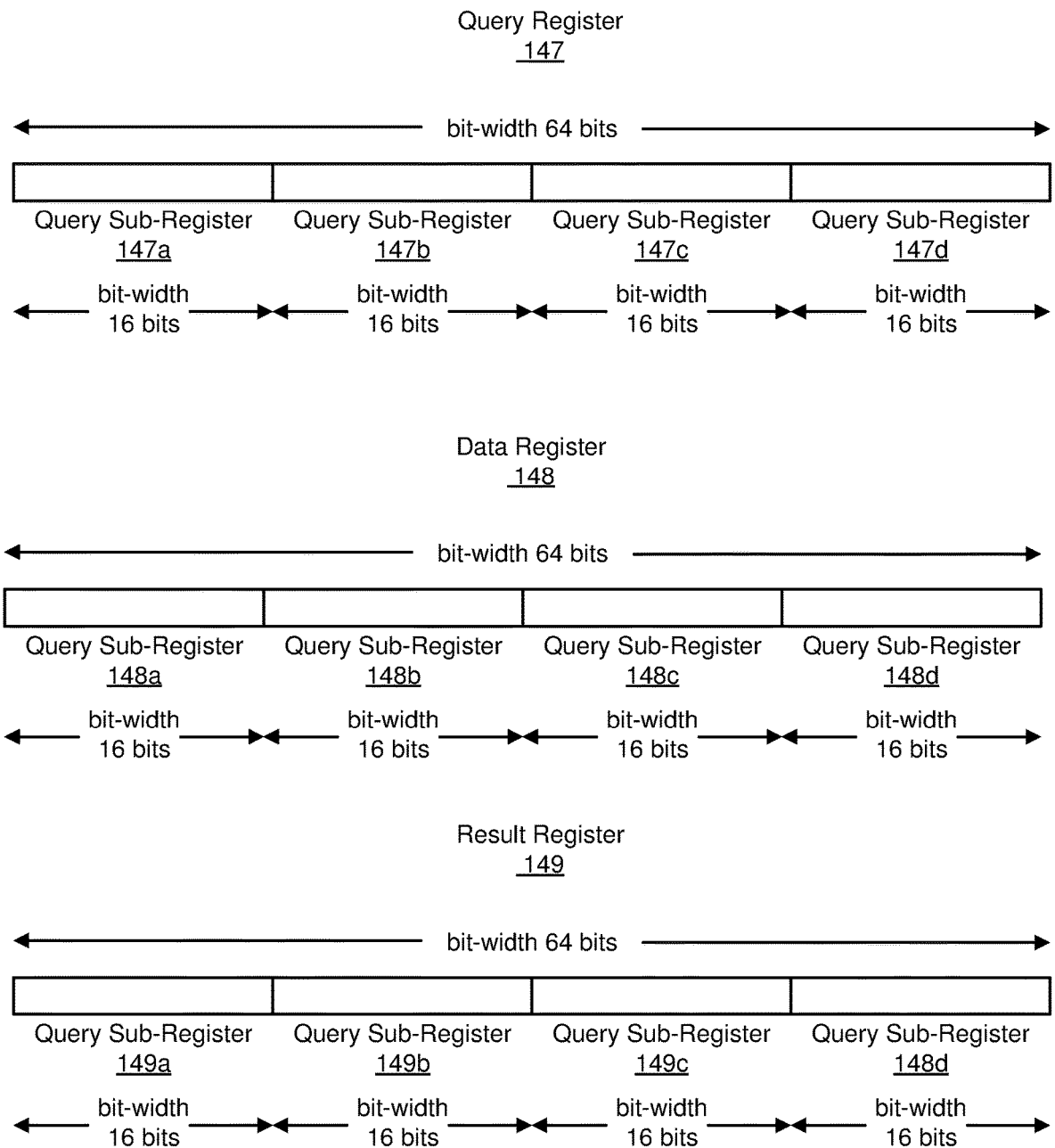
FIG. 3 is a diagram illustrating further aspects of accelerated operations on compressed data stores, in accordance with an embodiment of the invention.

Dispatcher 145 moves modified decoded data terms 222, 223, 224, etc. corresponding to modified decoded block 220 into data register 148 and truncated search term 231 into query register 147 prior to operations system 140 executing a query operation, and moves search result 132 into query data store 142 after operations system 140 completes a query operation, as described below. Dispatcher 145 determines the number of modified decoded data terms 231, 232, 234, etc., that can be loaded into data register 148 by dividing. In the example of FIG. 2, the target word size is 16 bits and the bit-width of data register 148 is 64, so 4 modified decoded terms can be loaded into data register 148. The number of terms that can be loaded into the data register is the "load count." This is illustrated in FIG. 3 by data sub-registers 148a, 148b, 148c, 148d, each comprising 16 bits. Dispatcher 145 determines the number of instances of truncated search term 232 that can be loaded into query register 147 by dividing the bit-width of query register 147 by the target word size. In the example of FIG. 2, the target word size is 16 bits and the bit-width of query register 147 is 64, so 4 instances can be loaded into query register 147 (i.e., the load count is 4). This is illustrated in FIG. 3 by query sub-registers 147a, 147b, 147c, 147d, each comprising 16 bits. In an embodiment where query register 147 and data register 148 have different bit-widths, the load count will be limited by the bit-width of the smallest register. Dispatcher 145 loads the first modified decoded term 232 into the least significant bits of data sub-register 148a. Dispatcher 145 loads the following modified decoded terms 223, 224, etc., into the least significant bits of the following data sub-registers 148b, 148c, etc. Dispatcher 145 loads one instance of truncated search term 232 into the least significant bits of each of the query sub-registers 147a, 147b, 147c, 148d. Using the invention, four modified decoded data terms 223, 223, 224, etc., and four instances of truncated search terms 232 can be loaded into data register 148 and query register 147, respectively. In contrast, without using the invention, the smallest bit-width query operation that is at least as many bits as the bit-width of the uncompressed data terms (17-18 bits each) would be 32 bits. Only two fully decoded (uncompressed) data terms 202, 203, 204 could be loaded in data register 148, and two instances of search term 132 of 17 bits each could be load in query register 147. It is preferable that query register 147 comprise at least as many bits as data register 148.

Processing unit 146 completes query operations on modified decoded data terms 231, 232, 234 and truncated search term 232. Processing unit 146 may be a processor, such as a central processing unit (CPU) or a graphics processing unit (GPU), having registers such as query register 147 and data register 148. Processing unit 146 executes query operations on query register 147 and data register 148. Processor unit 146 may perform parallel operations, such as single instruction, multiple data ("SIMD") operations (e.g., compare packed bytes for equal ("PCMPEQB")). In an example, a "compare data for equal" operation compares each modified decoded data term 231, 232, 234, etc., in each corresponding data sub-register 148a, 148b, 148c, etc., to the truncated search term 232 in the corresponding query sub-register 147a, 147b, 147c, etc., and stores the results in result register 149. For example, modified decoded term 231 in data sub-register 148a is compared to truncated search term 232 in query sub-register 147a, modified decoded term 232 in data sub-register 148b is compared to truncated search term 232 in query sub-register 147b, etc. Using the invention in this example, processing unit 146 can execute four query operations and provide four results in one operation. Without using this invention in this example, processing unit 146 could only execute two query operations (32 bits each) and provide two query results in one operation. When a query operation completes, processing unit stores the result in the corresponding result sub-register. In an example, when there is a match processing unit 146 may load the corresponding result sub-register with a binary "1"; when there is not a match, processing unit 146 may load the corresponding result sub-register with a "0". Dispatcher 145 stores the results of the query operations in query data store 142. Dispatcher 145 may then load data register 148 with the next sequential modified decoded data terms. Operations system 140 will continue performing query operations until an end state is reached. In an example, an end state may comprise finding a match. In another example, an end state may comprise querying the last modified decoded data term of modified decoded block 220.

In an embodiment, operations system 140 receives multiple encoded data blocks 210 and performs the above-described steps for a plurality of encoded data blocks 210. In an example, operations system 140 has received multiple encoded data blocks 210 and has not determined which encoded data block 201 contains the search term. In this embodiment, operation selector 143 selects a query operation and a target word size corresponding to each encoded data block 210 based on the available bit-width query operations and based on the range corresponding to each encoded data block 210, as described above. Truncator 144 converts each prefix term 211 corresponding to each encoded data block 210 to a truncated prefix term 221 corresponding to each encoded data block 210 based on the target words size corresponding to each encoded data block 210. Truncator 144 converts each delta encoded block 210 into corresponding modified decoded block 220 comprising modified decoded delta terms 222, 223, 224, etc., based on the truncated prefix term corresponding to each delta encoded block 210, as described above. Truncator 144 converts search term 211 into a plurality of truncated search terms 231, each corresponding to a delta encoded block 210, based on the target word size corresponding to each delta encoded block 210, as described above. Dispatcher 145 determines the load count for each modified decoded block 220 based on the bit-width of data register 148 and the target word size corresponding to each modified decoded block 220. Dispatcher 145 moves modified decoded data terms 222, 223, 224, etc. corresponding to each modified decoded block 220 into data register 148 and truncated search term 231 into query register 147 prior to operations system 140 executing a query operation, and moves each corresponding search result 132 into query data store 142 after operations system 140 completes a query operation. Processing unit 146 completes query operations on modified decoded data terms 231, 232, 234 corresponding to each modified decoded block 220 and based on truncated search term 232 until an end state is reached, as described above.

Using the invention, operations system 140 is adaptable (or customizable) to the density of the data in multiple data blocks 200. In an example, operations system 140 may perform query operations on multiple delta encoded blocks 210, each having a different density, or range. A data block 200 which encompasses a larger range of values may have a larger truncated prefix term 211, resulting in larger modified decoded data terms 222, 223, 224, etc (while still smaller than fully decoded data terms), while a data block 200 which compasses a relatively smaller range of values may have a smaller truncated prefix term 211, resulting in smaller modified decoded terms 222, 223, 224, etc. (In some examples, each modified decoded block 220 may be queried using the same search term 131; in other examples each modified decoded block 220 may be queried using different search terms 131.) This is advantageous when working with unpredictable data, such as website visitation data because preconfiguring a system with a query register 147 sub-register size and data register 148 sub-register size may require selecting the largest necessary size, reducing the efficiency of the query system.

Operations system 140 returns the result of the query operations i.e., search result 132, to requesting system 130 when an end state is reached. In an example, operations system 140 may return a result corresponding to "match" or "no match." In another example, operations system 140 may use prefix term 211 and delta terms 212, 213, 214, etc., to generate uncompressed data term 202, 203, 204, etc., corresponding to a modified decoded data term 222, 223, 224, etc., which matches the truncated search term, and returning the matching uncompressed data term to requesting system 130.

Figure 4:
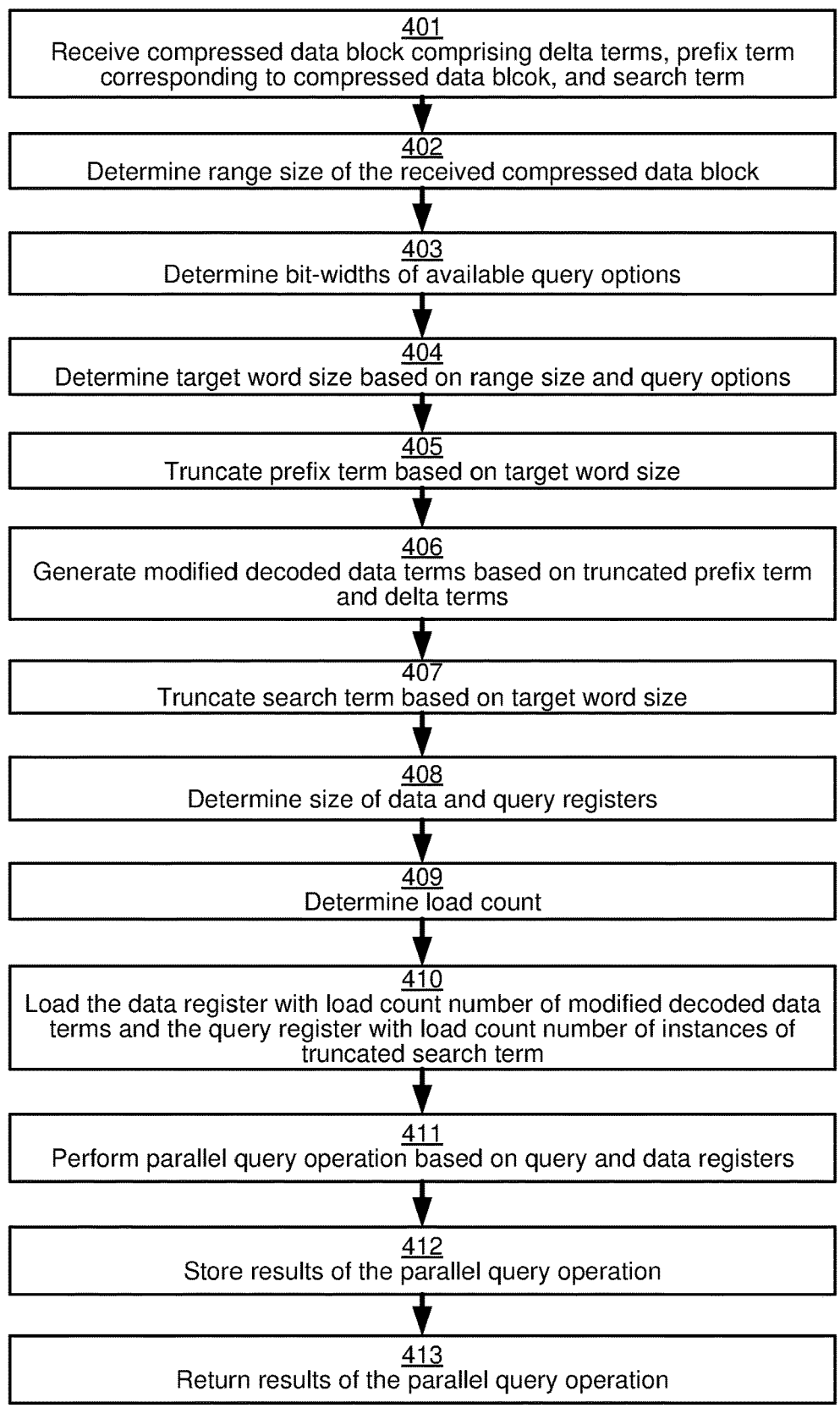
FIG. 4 is a flow chart illustrating a method of performing accelerated operations on compressed data stores, in accordance with an embodiment of the invention.

FIG. 4 is a flow chart illustrating a method of performing a modified decoding (or decompression) of previously encoded (or compressed) data to perform an adaptively selected operation, such as a query operation. In some implementations, the steps are performed in an order other than the order presented in FIG. 4, and in other implementations, additional or alternative steps may be performed.

At step 401, operations system 140 receives search term 131 from query system 130 and compressed data 126 from data compression system 120. In an example, compressed data 126 is compressed using delta encoding techniques and comprises delta encoded block 210 and prefix term 211. Optionally, operations system 140 receives a range size corresponding to delta encoded block 210

At step 402, operations system 140 optionally determines a range size corresponding to delta encoded block 210. In the example of FIG. 2, the range is 32233 (decimal).

At step 403, operations system 140 determines the bit-widths of available query options corresponding to query register 147 and data register 148. In the example of FIG. 2, the bit-width of query register 147 and data register 148 are each 64 bits, and the bit-widths of the available query operations are 8 bits, 16 bits, 32 bits, and 64 bits.

At step 404, operations system 140 determines the target word size corresponding to the smallest bit-width query operation that is at least many bits as the range of data block 200. In the example of FIG. 2, the range requires 15 bits; the smallest bit-width query operation that is at least as many bits as the range is 16 bit; the determined target word size 16 bits.

At step 405, operations system 140 truncates the prefix term 211 by retaining the least significant bits of prefix term 210 corresponding to the number of bits in the target word size, and dropping the remaining the most significant bits, resulting in truncated prefix term 221 comprising a number of bits equal to the selected target word. In the example of FIG. 2, prefix term 211 is equal to a decimal value of 68,926 with a corresponding binary representation of 10000110100111110, or 17 bits. The target word size is 16 bits. The most significant bit of the binary representation of prefix term 211 is truncated to create a 16 bit truncated prefix term 221 of 0000110100111110

At step 406, operations system 140 generates modified decoded data terms based on truncated prefix term 221 and delta terms 212, 213, 214, etc. Modified decoded data term 222 is generated by adding delta term 212 to truncated prefix 221; modified decoded term 223 is generated by adding delta term 213 to modified decoded term 222; and so on for the remaining modified decoded terms. In this way, modified decoded terms 222, 223, 224, etc., are all distinguishable, while requiring less space than the corresponding fully decoded terms At step 407, operations system 140 generates truncated search term 232 by retaining the least significant bits of search term 131 corresponding to the number of bits in the target word size, and dropping the remaining most significant bits of search term 131, resulting in truncated search term 231 comprising a number of bits equal to the selected target word. In the example of FIG. 2, search term 131 is 81,104 in decimal, 10011110011010000 (17 bits) in binary. Truncator 144 truncates the most significant bit of the binary representation of search term 131 to create a 16 bit truncated search term 231 of 0011110011010000.

At step 409, operations system 140 determines the load count by determining the number of modified decoded data terms 231, 232, 234, etc., that can be loaded into data register 148 by dividing the bit-width of data register 148 by the target word size. In the example of FIG. 2, the target word size is 16 bits and the bit-width of data register 148 is 64, so four modified decoded terms can be loaded into data register 148. In this example, the number of terms that can be loaded into the data register, or the "load count" is four. In the example of FIG. 2, the load count is illustrated by data sub-registers 148a, 148b, 148c, 148d and query sub-registers 147a, 147b, 147c, 147d.

At step 410, operations system 140 loads data register 148 with load count number of modified decoded data terms 231, 232, 234, etc., by loading the first modified decoded term 231 into the least significant bits of the first data sub-register 148a, then sequentially loading the following modified decoded terms into the least significant bits of the following data sub-registers. Load query register 147 with load count number of instances of truncated search term 231 by loading one instance of truncated search term 231 into the least significant bits of each of the query sub-registers 147a, 147b, 147c, 147d.

At step 411, operations system 140 performs parallel query operation by comparing each modified decoded data term 231, 232, 234, etc., in each corresponding data sub-register 148a, 148b, 148c, etc., to truncated search term 232 in each the corresponding query sub-register 147a, 147b, 147c, etc.; and storing the results of the query operations in result register 149.

At step 412, operations system 140 stores search result 132 in result register.

In an embodiment, operations system 140 may repeat some or all of steps 401 through 412 on additional compressed data blocks. Operations system 140 may retrieve multiple compressed data blocks. In an example, operations system 140 may complete some or all of steps 401 through 412 on all retrieved data blocks. In another example, operations system 140 may complete some or all of steps 401 through 412 on each retrieved data block until a match is found. When operations system 140 may complete some or all of steps 401 through 412 on multiple data blocks having different ranges, the determined target word size may be different for each block; thus truncated prefix terms 211, modified decoded terms 231, 232, 234, etc., truncated search terms 232, and load count may be different.

At step 413, operations system 140 returns search result 132 to requesting system 130.

Additional Embodiments

In other embodiments, the invention disclosed herein may be used by compressing data using other types of encoding. In an example, data may be compressed using a delta-four encoding technique. Using delta-four encoding techniques, the first four terms, n0-n4, of a sequence of nX terms can be stored. Instead of storing the terms n5-n8, the deltas corresponding to the difference nX and n(X-4), in this example (n5-n1), (n6-n2), (n7-n3), (n8-n4). In an embodiment, a block of X terms, which comprise unique data terms arranged in order of increasing or decreasing value, may comprise a set of prefix terms. The set of prefix terms contains terms that are no larger than the smallest corresponding uncompressed data terms in the corresponding block. For example, the set of prefix terms may contain terms P1, P2, P3, P4, where P4 is smaller than n0. In an example, the set of prefix term is the corresponding set of largest uncompressed data terms in the previous uncompressed block. In this example, the first term in the compressed block is the difference between the first term in the corresponding set of prefix terms and the first uncompressed data term, the second term in the compressed block is the difference between the second term in the corresponding set of prefix terms and the second uncompressed data term, etc. Each compressed data block has a largest delta corresponding to the largest delta term in the compressed data block. Each compressed data block has a range corresponding to the difference between the largest uncompressed data term and the smallest uncompressed data term in the compressed block. In this embodiment, operations system 140 receives compressed data 126 (where compressed data 126 comprises data compressed using delta-four encoding and a corresponding set of prefix terms) and search term 131, and using the techniques described above, completes a modified decoding of compressed data 126, generates a truncated search term, completes a data operation such as query operation using the modified decoded data and the truncated search term, and returns the result of the operation, such as search result 132, to requesting system 130. Advantageously, performing the modified decoding can be done quicker than performing the modified decoding on data compressed using standard delta encoding as described above, because the modified decoding can be performed on four terms in parallel, or simultaneously.

Figure 5:
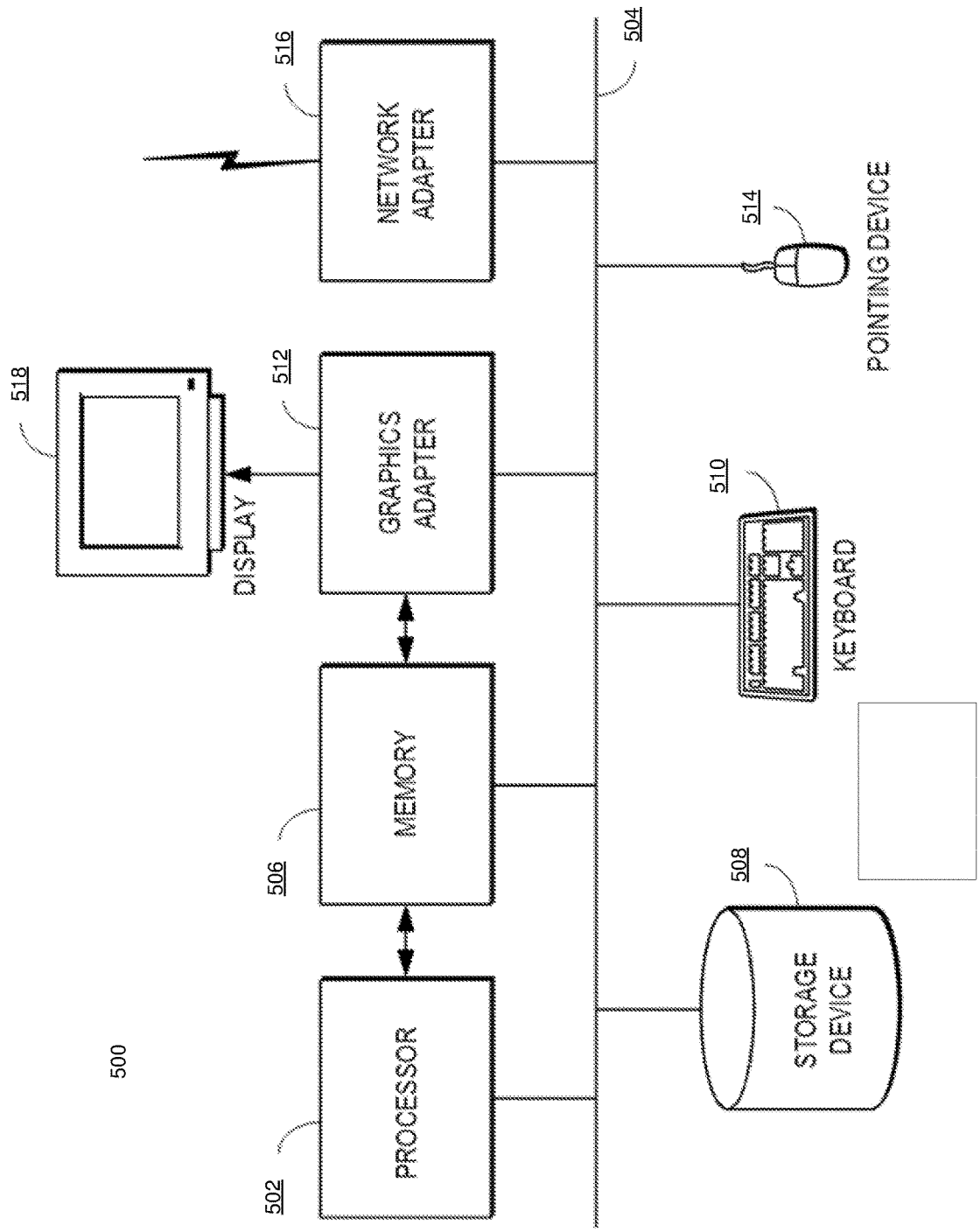
FIG. 5 is a high-level block diagram of the components of a computing system for use in performing accelerated operations on compressed data stores, in accordance with an embodiment of the invention.

FIG. 5 is a high-level block diagram of the components of a computing system 500 for use, for example, as entities 110, data compressions system 120, requesting system 130, or operations system 140 of FIG. 1. Illustrated are a processor 502, a memory 506, a storage device 508, a keyboard 510, a graphics adapter 512, an input device 514, and a network adapter 516 coupled to a bus 504. A display 518 is coupled to the graphics adapter 512.

FIG. 5 comprises a processor 502, which may be any general-purpose processor. The storage device 508 is, in one embodiment, a hard disk drive but can also be any other device capable of storing data, such as a writeable compact disk (CD) or DVD, or a solid-state memory device. The memory 506 may be, for example, firmware, read-only memory (ROM), non-volatile random access memory (NVRAM), and/or RAM, and holds instructions and data used by the processor 502. The input device 514 may be a mouse, track ball, stylus, touchscreen, or other type of input device, and is used in combination with the keyboard 510 to input data into the computer 500. The graphics adapter 512 displays images and other information on the display 518. The network adapter 516 couples the computer 500 to the network (not shown). In one embodiment, the network is the Internet. The network can also utilize dedicated or private communications links that are not necessarily part of the Internet.

As is known in the art, the computer 500 is adapted to execute computer program modules. As used herein, the term "module" refers to computer program logic and/or data for providing the specified functionality. A module can be implemented in hardware, firmware, and/or software. In one embodiment, the modules are stored on the storage device 508, loaded into the memory 506, and executed by the processor 502. The computer 500 is configured to perform the specific functions and operations by various modules, for example as detailed in FIG. 1, and thereby operates as a particular computer under such program control. The types of computers 500 utilized by the entities of FIG. 1 can vary depending upon the embodiment and the processing power utilized by the entity.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A method of performing a query operation on compressed data, comprising:
   receiving, at a query system comprising a query register and a data register, each having a bit-width, and a plurality of selectable bit-width operations:
      from a data compression system, a plurality of prefix terms;
      from the data compression system, a delta compressed data block corresponding to an uncompressed data block, the uncompressed data block comprising a plurality of numerically ordered terms, wherein the delta compressed data block comprises a plurality of numerically ordered delta terms, wherein each of the numerically ordered delta terms corresponds to a difference between one of the plurality of prefix terms and one of the plurality of the numerically ordered terms; and
      from a requesting system, a search term;
   determining, by the query system, that the search term is present in the uncompressed data block, the determining comprising:
      determining a target word size based on a range corresponding to the delta compressed data block and on the plurality of selectable bit-width operations;
      generating a plurality of truncated prefix terms based on the plurality of prefix terms;
      generating a plurality of modified decoded terms, each of the plurality of modified decoded terms based on a corresponding delta term and on one of the plurality of truncated prefix terms;
      generating a truncated search term based on the search term and on the target word size;
      determining a load count based on the target word size and on the data register bit-width;
      loading the data register with the load count number of modified decoded terms;
      loading the query register with the load count number of instances of the truncated search term; and
      performing a parallel compare operation comparing each modified decoded term in the data register with a corresponding truncated search term in the query register; and
   responsive to determining that the search term is present in the uncompressed data block, returning a result of the compare operation to the requesting system.

2. The method of claim 1, wherein the uncompressed data block comprises a plurality of entity identifiers, and wherein the search term is a specific entity identifier.

3. The method of claim 1, wherein the target word size corresponds to a smallest of the selectable bit-width operations that is at least as large as a minimum number of bits required to represent the range.

4. The method of claim 1, wherein determining a target word size based on the range further comprises determining the range.

5. The method of claim 1, wherein each of the plurality of modified decoded terms, the truncated prefix term, and the truncated search term comprises a number of least significant bits corresponding to the target word size.

6. The method of claim 1, wherein returning the result comprises returning an uncompressed data term corresponding to a modified decoded term which matches the truncated search term.

7. The method of claim 1, wherein the delta compressed data block is a first delta compressed data block, the uncompressed data block is a first uncompressed data block, the plurality of numerically ordered delta terms is a first plurality of numerically ordered delta terms, the target word size is a first target word size, the range is a first range, the plurality of prefix terms is a first plurality of prefix terms, the plurality of truncated prefix terms is a first plurality of truncated prefix terms, the truncated search term is a first truncated search term, the load count is a first load count, and the compare operation is the first compare operation, and further comprising:
   receiving, at the query system:
      from the data compression system, a second plurality of prefix terms;
      from the data compression system, a second delta compressed data block corresponding to a second uncompressed data block, the second uncompressed data block comprising a second plurality of numerically ordered terms, wherein the second delta compressed data block comprises a second plurality of numerically ordered delta terms, wherein each of the second plurality of numerically ordered delta terms corresponds to a difference between one of the second plurality of prefix terms and one of the second plurality of numerically ordered terms, wherein a second range corresponding to the second delta compressed data block is different than the first range;

determining, by the query system, that the search term is present in the second uncompressed data block, the determining comprising:

determining a second target word size based on the second range and on the plurality of selectable bit-width operations, wherein the second target word size is different than the first target word size;

generating a second plurality of truncated prefix terms based on the second plurality of prefix terms;

generating a second plurality of modified decoded terms, each of the second plurality of modified decoded terms based on a corresponding delta term of the second plurality of delta terms and on one of the second plurality of truncated prefix terms;

generating a second truncated search term based on the search term and on the second target word size;

determining a second load count based on the second target word size and on the data register bit-width;

loading the data register with the second load count number of the second plurality of modified decoded terms;

loading the query register with the second load count number of instances of the second truncated search term; and performing a second parallel compare operation comparing each of the second plurality of modified decoded terms in the data register with a corresponding second truncated search term in the query register; and responsive to determining that the search term is present in the second uncompressed data block, returning a result of the compare operation to the requesting system, wherein the result of the compare operation comprises a result based on the first compare operation and the second compare operation.

8. A non-transitory computer-readable storage medium storing processor-executable computer program instructions that, when executed, cause a computer processor to perform a method, the method comprising:

receiving, at a query system comprising a query register and a data register, each having a bit-width, and a plurality of selectable bit-width operations:

from a data compression system, a plurality of prefix terms;

from the data compression system, a delta compressed data block corresponding to an uncompressed data block, the uncompressed data block comprising a plurality of numerically ordered terms, wherein the delta compressed data block comprises a plurality of numerically ordered delta terms, wherein each of the numerically ordered delta terms corresponds to a difference between one of the plurality of prefix terms and one of the plurality of the numerically ordered terms; and from a requesting system, a search term;

determining, by the query system, that the search term is present in the uncompressed data block, the determining comprising:

determining a target word size based on a range corresponding to the delta compressed data block and on the plurality of selectable bit-width operations;

generating a plurality of truncated prefix terms based on the plurality of prefix terms;

generating a plurality of modified decoded terms, each of the plurality of modified decoded terms based on a corresponding delta terms and on one of the plurality of truncated prefix terms;

generating a truncated search term based on the search term and on the target word size;

determining a load count based on the target word size and on the data register bit-width;

loading the data register with the load count number of modified decoded terms;

loading the query register with the load count number of instances of the truncated search term; and performing a parallel compare operation comparing each modified decoded term in the data register with a corresponding truncated search term in the query register; and responsive to determining that the search term is present in the uncompressed data block, returning a result of the compare operation to the requesting system.

9. The medium of claim 8, wherein the uncompressed data block comprises a plurality of entity identifiers each corresponding to an entity, and wherein the search term is a specific entity identifier.

10. The medium of claim 8, wherein the target word size corresponds to a smallest of the selectable bit-width operations that is at least as large as a minimum number of bits required to represent the range.

11. The medium of claim 8, wherein determining a target word size based on the range further comprises determining the range.

12. The medium of claim 8, wherein each of the plurality of modified decoded terms, the truncated prefix term, and the truncated search term comprises a number of least significant bits corresponding to the target word size.

13. The medium of claim 8, wherein returning the result comprises returning an uncompressed data term corresponding to a modified decoded term which matches the truncated search term.

14. The medium of claim 8, wherein the delta compressed data block is a first delta compressed data block, the uncompressed data block is a first uncompressed data block, the plurality of numerically ordered delta terms is a first plurality of numerically ordered delta terms, the target word size is a first target word size, the range is a first range, the prefix term is a first prefix term, the truncated prefix term is a first truncated prefix term, the truncated search term is a first truncated search term, the load count is a first load count, and the compare operation is the first compare operation, and the method further comprising:

receiving, at the query system:

from the data compression system, a second plurality of prefix terms;

from the data compression system, a second delta compressed data block corresponding to a second uncompressed data block, the second uncompressed data block comprising a second plurality of numerically ordered terms, wherein the second delta compressed data block comprises a second plurality of numerically ordered delta terms, wherein each of the second plurality of numerically ordered delta terms corresponds to a difference between one of the second plurality of prefix terms and one of the second plurality of numerically ordered terms, wherein a second range corresponding to the second delta compressed data block is different than the first range;

determining, by the query system, that the search term is present in the second uncompressed data block, the determining comprising:
  determining a second target word size based on the second range and on the plurality of selectable bit-width operations, wherein the second target word size is different than the first target word size;
  generating a second plurality of truncated prefix terms based on the second plurality of prefix terms;
  generating a second plurality of modified decoded terms, each of the second plurality of modified decoded terms based on a corresponding delta term of the second plurality of delta terms and on one of the second plurality of truncated prefix terms;
  generating a second truncated search term based on the search term and on the second target word size;
  determining a second load count based on the second target word size and on the data register bit-width;
  loading the data register with the second load count number of the second plurality of modified decoded terms;
  loading the query register with the second load count number of instances of the second truncated search term; and
  performing a second parallel compare operation comparing each of the second plurality of modified decoded terms in the data register with a corresponding second truncated search term in the query register; and responsive to determining that the search term is present in the second uncompressed data block, returning a result of the compare operation to the requesting system.wherein the result of the compare operation comprises a result based on the first compare operation and the second compare operation.

15. A system comprising:
a processor; and
a non-transitory computer-readable storage medium storing processor-executable computer program instructions that, when executed, cause a computer processor to perform a method, the method comprising:
  receiving, at a query system comprising a query register and a data register, each having a bit-width, and a plurality of selectable bit-width operations:
    from a data compression system, a plurality of prefix terms;
    from the data compression system, a delta compressed data block corresponding to an uncompressed data block, the uncompressed data block comprising a plurality of numerically ordered terms, wherein the delta compressed data block comprises a plurality of numerically ordered delta terms, wherein each of the numerically ordered delta terms corresponds to a difference between one of the plurality of prefix terms and one of the plurality of the numerically ordered terms; and
    from a requesting system, a search term;
  determining, by the query system, that the search term is present in the uncompressed data block, the determining comprising:
    determining a target word size based on a range corresponding to the delta compressed data block and on the plurality of selectable bit-width operations;
    generating a plurality of truncated prefix terms based on the plurality of prefix terms;
    generating a plurality of modified decoded terms, each of the plurality of modified decoded terms based on the corresponding delta terms and on one of the plurality of truncated prefix terms;
    generating a truncated search term based on the search term and on the target word size;
    determining a load count based on the target word size and on the data register bit-width;
    loading the data register with the load count number of modified decoded terms;
    loading the query register with the load count number of instances of the truncated search term; and
    performing a parallel compare operation comparing each modified decoded term in the data register with a corresponding truncated search term in the query register; and
  responsive to determining that the search term is present in the uncompressed data block, returning a result of the compare operation to the requesting system.

16. The system of claim 15, wherein the uncompressed data block comprises a plurality of entity identifiers each corresponding to an entity, and wherein the search term is a specific entity identifier.

17. The system of claim 15, wherein the target word size corresponds to a smallest of the selectable bit-width operations that is at least as large as a minimum number of bits required to represent the range.

18. The system of claim 15, wherein determining a target word size based on the range further comprises determining the range.

19. The system of claim 15, wherein each of the plurality of modified decoded terms, the truncated prefix term, and the truncated search term comprises a number of least significant bits corresponding to the target word size.

20. The system of claim 15, wherein returning the result comprises returning an uncompressed data term corresponding to a modified decoded term which matches the truncated search term.

21. The system of claim 15, wherein the delta compressed data block is a first delta compressed data block, the uncompressed data block is a first uncompressed data block, the plurality of numerically ordered delta terms is a first plurality of numerically ordered delta terms, the target word size is a first target word size, the range is a first range, the prefix term is a first prefix term, the truncated prefix term is a first truncated prefix term, the truncated search term is a first truncated search term, the load count is a first load count, and the compare operation is the first compare operation, and the method further comprising:
  receiving, at the query system:
    from the data compression system, a second plurality of prefix terms;
    from the data compression system, a second delta compressed data block corresponding to a second uncompressed data block, the second uncompressed data block comprising a second plurality of numerically ordered terms, wherein the second delta compressed data block comprises a second plurality of numerically ordered delta terms, wherein each of the second plurality of numerically ordered delta terms corresponds to a difference between one of the second plurality of prefix terms and one of the second plurality of numerically ordered terms, wherein a second range corresponding to the second delta compressed data block is different than the first range;

determining, by the query system, that the search term is present in the second uncompressed data block, the determining comprising:

determining a second target word size based on the second range and on the plurality of selectable bit-width operations, wherein the second target word size is different than the first target word size;

generating a second plurality of truncated prefix terms based on the second plurality of prefix terms;

generating a second plurality of modified decoded terms, each of the second plurality of modified decoded terms based on a corresponding delta term of the second plurality of delta terms and on one of the second plurality of truncated prefix terms;

generating a second truncated search term based on the search term and on the second target word size;

determining a second load count based on the second target word size and on the data register bit-width;

loading the data register with the second load count number of the second plurality of modified decoded terms;

loading the query register with the second load count number of instances of the second truncated search term; and performing a second parallel compare operation comparing each of the second plurality of modified decoded terms in the data register with a corresponding second truncated search term in the query register; and responsive to determining that the search term is present in the second uncompressed data block, returning a result of the compare operation to the requesting system, wherein the result of the compare operation comprises a result based on the first compare operation and the second compare operation.

\* \* \* \* \*